L. W. PALMER.
BUSHING.
APPLICATION FILED MAR. 12, 1918.
1,283,281.
Patented Oct. 29, 1918.
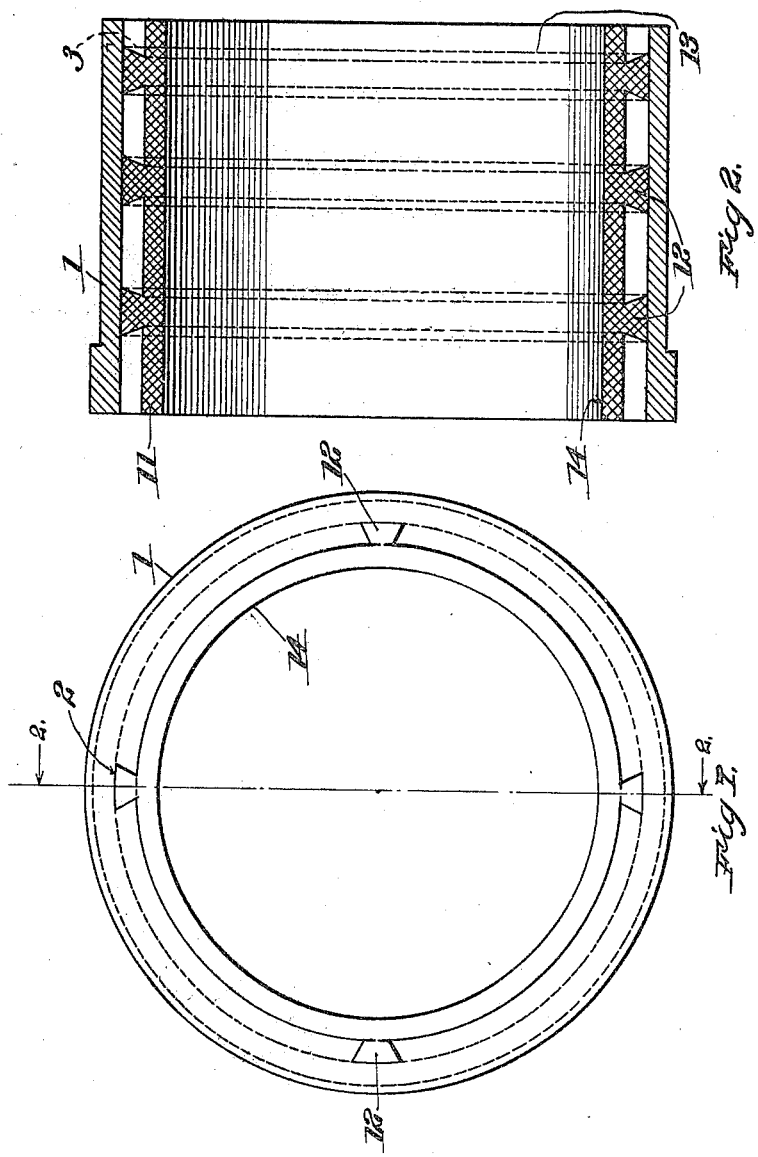
INVENTOR
Luther W. Palmer,
WITNESSES
Albert Davis
N. L. Collamer
BY Richard B. Owen,
ATTORNEY

UNITED STATES PATENT OFFICE.

LUTHER W. PALMER, OF SAYRE, PENNSYLVANIA.

BUSHING.

1,283,281. Specification of Letters Patent. Patented Oct. 29, 1918.

Application filed March 12, 1918. Serial No. 221,984.

*To all whom it may concern:*

Be it known that I, LUTHER W. PALMER, a citizen of the United States, residing at Sayre, in the county of Bradford and State of Pennsylvania, have invented certain new and useful Improvements in Bushings, of which the following is a specification.

This invention relates to bushings, and its object is to provide a bushing which in use will fit closely to the rod to which it is applied. Further objects are to cheapen the cost of manufacture and to lengthen the life of the article. Details of the construction will be set forth below, reference being made to the accompanying drawings, wherein:—

Figure 1 is an end elevation of this bushing, and

Fig. 2 is a sectional view on the line 2—2 of Fig. 1.

The bushing comprises a shell 1 which is by preference made of cast iron, and a liner 11 which is preferably composed of brass. The shell may have a suitable external configuration, but internally I prefer to provide it with a plurality of longitudinal grooves 2 and a plurality of annular grooves 3, four of the former and three of the latter being shown in the drawings. These grooves are preferably dove-tailed in cross section as shown. The shell is by preference cast in the rough and then machined, and of course its size and exact details are dependent on the uses to which it is to be put.

The liner 11 is by preference poured into the shell in a molten condition and allowed to form and to set therein, and in doing so it obviously produces ribs or tongues 12 which enter the grooves 2 and ribs or tongues 13 which enter the grooves 3, while the bore 14 of the liner will have the shape of the rod or pin or journal upon which it is to be mounted, and here again the details are unimportant.

When the two parts of this bushing are connected while hot and allowed to cool after being connected, the iron contracts very slightly and the brass expands, also slightly, and therefore the parts become intimately and rigidly connected to each other. The longitudinal tongues and grooves obviously prevent the liner from rotation within the shell, whereas the other tongues and grooves prevent the parts from being disconnected axially. I have found that the life of a bushing of this character under the most trying conditions of wear is considerable, and the results gained from its use are satisfactory. I have spoken of brass for the liner, but do not wish to be limited in this respect as it is quite possible a suitable alloy may be employed. Nor do I wish to be limited to details further than as set forth below.

What is claimed is:—

1. The herein described bushing comprising a shell of cast iron having internal grooves extending at right angles to each other, and a liner of brass located within the shell and having tongues engaging said grooves.

2. The herein described bushing comprising a shell of one metal having internal annular and longitudinal grooves, and a liner of another metal disposed within the shell and having tongues closely fitting said grooves.

3. In a bushing, the combination with a shell having internal grooves of dove-tailed cross section extending in directions at angles to each other; of a liner of plastic material within said shell and having tongues fitting the grooves.

4. In a bushing, the combination with a cast iron shell having internal annular and longitudinal grooves whose walls converge toward the axis of the shell; of a liner of brass disposed within said shell and having dove-tailed tongues fitted to said grooves, for the purposes set forth.

In testimony whereof I affix my signature in presence of two witnesses.

LUTHER W. PALMER.

Witnesses:
H. H. MERCEREAN,
M. C. MOODY.

Copies of this patent may be obtained for five cents each, by addressing the "Commissioner of Patents, Washington, D. C."